Patented Apr. 24, 1945

2,374,600

UNITED STATES PATENT OFFICE 2,374,600

ALKYLATION OF AROMATIC HYDROCARBONS

Vladimir N. Ipatieff and Louis Schmerling, Riverside, Ill., assignors to Universal Oil Products Company, Chicago, Ill., a corporation of Delaware Application May 13, 1943, Serial No. 486,838

14 Claims. (Cl. 260—671)

This is a continuation-in-part of our co-pending application Serial No. 443,398 filed May 18, 1942, which in turn is a continuation-in-part of our application Serial No. 430,495, filed February 11, 1942.

This invention relates to the production of alkyl aromatics from aromatic hydrocarbons and alcohols. It is specifically concerned with the production of monoethylbenzene from benzene and ethyl alcohol.

Aromatic hydrocarbons such as benzene are readily alkylated with olefinic hydrocarbons, e. g., ethylene, propylene, butylene, etc. in the presence of a variety of alkylation catalysts. One process which is of particular importance comprises the production of monoethylbenzene by the alkylation of benzene with ethylene using a solid phosphoric acid catalyst. Other alkylating catalysts may also be employed such as certain of the metal phosphates, silica-alumina composites, and various silica-containing natural clays and earths. These catalysts are not necessarily equivalent in their effectiveness, however, since different operating conditions may be necessary dependent upon the particular catalyst and reactants employed. It is also possible to produce monoethylbenzene by reacting benzene and ethyl alcohol in the presence of an alkylation catalyst under suitable conditions of temperature and pressure. Many of the catalysts useful for the alkylation of aromatics, such as those hereinbefore specified, possess dehydrating properties, and apparently when they are used the reaction of benzene with ethyl alcohol proceeds by way of preliminary dehydration of the alcohol to ethylene which then reacts with the benzene.

It has been found that when benzene and ethylene are contacted under alkylating conditions with an alkylating and dehydrating catalyst such as the solid phosphoric acid catalyst the ethylene is substantially completely converted to alkyl benzenes in a single pass through the reaction zone leaving only a relatively small quantity of unreacted ethylene to be recycled in the process. However, when ethyl alcohol is employed as the alkylating agent, experimental tests have shown that substantially complete dehydration of the alcohol is obtained on a single pass through the catalyst zone but a very substantial proportion of the ethylene thus produced remains unconverted. This fact necessitates the recycle of relatively large quantities of ethylene to the alkylation zone in order to obtain complete utilization of the available ethylene.

It is one object of the present invention to provide an improved process for the production of alkyl aromatics from aromatics and aliphatic alcohols. Another object of the present invention is to overcome the inherent disadvantages resulting from incomplete conversion to ethylbenzenes when benzene is alkylated with ethyl alcohol. A still further object of this invention is to provide a unitary system for the dehydration of ethyl alcohol and the alkylation of benzene with the resultant ethylene.

In one broad aspect the invention comprises dehydrating an alcohol in one portion of an alkylation zone containing an alkylating and dehydrating catalyst, dissolving the resultant olefin in an aromatic hydrocarbon, and introducing said solution to another portion of said zone wherein the aromatic hydrocarbon is alkylated with said olefin.

In one specific embodiment the invention comprises a process for the production of monoethylbenzene which comprises introducing ethylene and a molar excess of benzene into the inlet end of an alkylation zone containing an alkylating and dehydrating catalyst and therein alkylating said benzene with said ethylene, introducing ethyl alcohol into said zone at a point intermediate the inlet and outlet thereof and therein dehydrating said alcohol to form ethylene and water, withdrawing the reaction mixture from the outlet end of said zone, fractionating said mixture to separate alkylation products and an unconverted benzene fraction containing dissolved ethylene, recovering said alkylation products, and recycling said solution of ethylene in benzene to the inlet of said zone.

Although the invention broadly contemplates the use of an alkylating and dehydrating catalyst, the preferred catalysts are those containing phosphoric acid which may constitute 80% or more by weight of the catalyst material and in most cases is not less than 30% by weight thereof. Of the various acids of phosphorus, ortho- or pyrophosphoric acids are generally preferred, although the invention is not restricted to their use but may employ catalyst composites formed from any of the other catalytically active acids of phosphorus, particularly those in which phosphorus has a valence of 5. The acids of phosphorus which may be employed will not be equivalent in their activity and the activity of the final catalytic mixture is also dependent upon the ratio of acid to other components present therein.

A particularly preferred catalyst is the so-called solid phosphoric acid catalyst comprising a calcined composite of a catalytically active acid of phosphorus and a generally siliceous adsorbent. Such a catalyst may be made by mixing an acid of phosphorus with a finely divided, relatively inert and generally siliceous carrier, such as diatomaceous earth, to form a rather wet paste (the acid ordinarily being in major proportion by weight); calcining at temperatures of about 750° F. to about 950° F. to produce a solid cake; grinding and sizing to produce particles of usable mesh; and dehydrating the catalyst granules at temperatures of between about 400° F. and about 600° F., and preferably at about 500° F., to produce an acid composition corresponding to the optimum alkylating activity. The catalyst preparation procedure may be varied by forming particles of the original paste by extrusion or by pelleting methods, followed by calcination and rehydration.

Alkylation of benzene by ethylene is effected in the presence of a solid phosphoric acid catalyst at temperatures of between about 400° F. and about 850° F. and preferably of about 500° F. to about 575° F. and at pressures of between about 300 and about 2000 pounds and preferably of between about 600 and about 900 pounds per square inch. The particular temperature and pressure employed will be correlated with the reaction time and ratio of benzene to ethylene to produce optimum results.

One important feature of the present invention resides in the use of a substantial molar excess of benzene over ethylene or ethyl alcohol in the alkylation step, e. g., the molar ratio of benzene to ethylene may be from about 4:1 to about 20:1. The presence of high molar excesses of benzene promotes the formation of the more desirable monoethylbenzene and minimizes the production of polyethylbenzenes. Moreover, since alkylation of benzene with ethylene is a highly exothermic reaction, the presence of a large excess of benzene in the alkylation zone will assist in attaining adiabatic operation because of the relatively high heat capacity of benzene. Another important advantage which results from the use of a large molar excess of benzene is found in the fact that recycling of the unconverted excess benzene to the alkylation step, as hereinafter described in greater detail, provides a convenient method for recycling unconverted ethylene to the alkylation step.

When ethyl alcohol and a molar excess of benzene are charged directly to a catalytic alkylation zone containing a solid phosphoric acid catalyst, substantially complete dehydration of the alcohol is obtained on a single pass through the catalyst zone but the conversion to ethylbenzene is often only about 25 to 35 mol per cent of the available ethylene.

In the process of the present invention the ethyl alcohol is charged into the process stream at some intermediate point in the catalyst zone or into the inlet of one of the last of a series of catalyst zones. The point of introduction of the ethyl alcohol is chosen so that the time of contact with the catalyst will be sufficient to effect substantially complete dehydration of the alcohol. The total reaction mixture comprising monoethylbenzene, polyethylbenzenes, benzene, ethylene, and water is subjected to fractionation. The overhead distillate from the fractionating column consisting principally of benzene, ethylene, and water is condensed and the water layer which is formed in the receiver is withdrawn. The temperature and pressure of the receiver are regulated to dissolve practically all of the ethylene in the liquid benzene. This stream of recycle benzene containing dissolved ethylene is then commingled with fresh benzene and charged to the inlet of the reaction zone. The ethylene and molar excess of benzene are contacted with sufficient catalyst to effect substantial completion of the alkylation of benzene with ethylene and at an intermediate point in the reaction zone ethyl alcohol is added. It will thus be seen that the remainder of the catalytic alkylation zone in the direction of flow of the reactants also functions to dehydrate the added ethyl alcohol. Some alkylation will also occur in this portion of the reaction zone between the benzene and in situ generated ethylene, but a substantial portion of the ethylene thus produced will remain unconverted to be recycled as hereinbefore described.

The invention thus avoids the inherent disadvantage of alkylating benzene with ethyl alcohol directly and at the same time provides a unitary system wherein benzene and ethyl alcohol are the raw materials for the production of monoethylbenzene. The process has the further advantage that the introduction of ethyl alcohol into the catalyst zone helps to maintain the solid phosphoric acid catalyst in a proper state of hydration.

Reference is now made to the drawing which illustrates in greater detail the preferred method of practicing the present invention.

Fresh benzene is introduced through line 1 containing valve 2 to pump 3 which discharges through line 4 containing valve 5 to heater 6. The heated benzene stream passes through line 7 and valve 8 to the first of a series of catalyst chambers designated by reference numerals 9, 10, and 11. A stream of recycle benzene obtained as hereinafter described is introduced from line 46 and commingled with fresh benzene in line 7. The catalyst chambers are preferably filled with particles of a solid phosphoric acid catalyst of the type hereinbefore described. The effluent stream from catalyst chamber 9 passes through line 12 and valve 13 to chamber 10. The effluent stream from chamber 10 is withdrawn through line 14 and valve 15 and introduced into the final chamber of the series.

Ethyl alcohol is introduced to the system through line 48 containing valve 49 to pump 50 which discharges through line 51 containing valve 52 to heater 53. The alcohol stream passes from heater 53 through line 54 containing valve 55 and is commingled in line 14 with the effluent reaction products from catalyst chamber 10.

The total reaction mixture is withdrawn from chamber 11 through line 16 containing valve 17, passes through heat exchanger 18, and is introduced by means of line 19 and valve 20 to fractionator 21.

In fractionator 21, alkylation products comprising monoethylbenzene and the higher boiling polyethylbenzenes are withdrawn through line 56 containing valve 57 and may be subjected to further fractionation in a rerun column not shown. The overhead product from fractionator 21 comprising essentially benzene, water and ethylene passes through line 22 containing valve 23 to heat exchanger 24. The cooled overhead stream passes through line 25 and valve 26 to condenser 27. The resultant condensate and any noncondensable gases present are transferred through line 28 containing valve 29 to receiver 30. In the event that small amounts of inert or noncondensable gases are present in the system, these may be vented at this point through line 31 containing valve 32. Ordinarily, when an ethylene fraction is employed as the raw material charged to the process substantial quantities of ethane associated with the ethylene will be vented from the system at this point. However, in the present invention since ethyl alcohol is the source of the ethylene reactant no substantial amount of ethane will be present.

In receiver 30 the water resulting from the dehydration of alcohol will separate out as a lower layer which may be withdrawn through line 33 and valve 34. The temperature and pressure in receiver 30 are easily regulated so that substantially all of the ethylene present will dissolve in the excess benzene. This solution of ethylene in benzene is withdrawn through line 35 and a portion thereof is returned through valve 36, pump 37, line 38 and valve 39 to the top of fractionator 21 as reflux. The remainder of the benzene-ethylene stream is withdrawn through line 40 containing valve 41 and is recycled by means of pump 42 through line 43 containing valve 44, heat exchanger 24, line 45 containing valve 45', heat exchanger 18, and line 46 containing valve 47 to line 7 wherein it is commingled with fresh benzene and introduced into the inlet of catalyst zone 9.

Although the drawing depicts an alkylation zone comprising three catalyst chambers wherein ethyl alcohol is introduced into the third or last chamber of the series, it will be readily apparent that the invention is not limited to any particular number of catalyst chambers. In certain cases it will be desirable to employ more than three chambers in series and in other cases fewer chambers may be employed.

It is within the scope of our invention to employ a single catalyst chamber with introduction of ethyl alcohol at a point intermediate the inlet and exit ends thereof. If desired, the alkylating catalyst may be disposed in separate beds in a single catalyst chamber with introduction of ethyl alcohol at an intermediate point between the catalyst layers or beds.

An alternative method of operation may be employed when the catalyst is disposed in a plurality of catalyst chambers as shown in the drawing. In this alternative method of operation valve 15 in line 14 is closed and the reaction products from catalyst chamber 10 are passed through line 14 and line 58 containing valve 59 to line 16. Ethyl alcohol is introduced to chamber 11 as previously described and in addition a portion of the fresh benzene from line 7 is diverted through line 60 and valve 61 to line 14 and thence into chamber 11. The effluent reaction mixture from chamber 10 and the reaction products from chamber 11 are commingled in line 16 and subjected to fractionation as hereinbefore described. This alternative method of operation has the advantage that the monoethylbenzene present in the effluent reaction mixture from chamber 10 is not subjected to further contact with ethyl alcohol or the ethylene produced therefrom in chamber 11. Thus the tendency toward formation of polyethylene benzenes in chamber 11 is avoided.

We claim as our invention:

1. An alkylation process which comprises introducing an aromatic hydrocarbon and an olefin into the inlet end of an alkylation zone and therein alkylating said aromatic hydrocarbon with said olefin, withdrawing reaction products from the outlet end of said alkylation zone, introducing an alcohol at a point intermediate the inlet and outlet of said zone and therein converting said alcohol to water and additional olefinic reactants, and recycling said last named olefinic reactants to the inlet of said zone.

2. A process for the production of ethylbenzene which comprises introducing ethylene and a molar excess of benzene into the inlet end of an alkylation zone containing an alkylating catalyst and therein alkylating said benzene with said ethylene, introducing ethyl alcohol into said zone at a point intermediate the inlet and outlet thereof and therein dehydrating said alcohol to form ethylene and water, withdrawing the reaction mixture from the outlet end of said zone, fractionating said mixture to separate alkylation products from an unconverted benzene fraction containing dissolved ethylene, recovering said alkylation products, and recycling said solution of ethylene in benzene to the inlet of said zone.

3. A process for the production of mono-ethylbenzene which comprises reacting benzene with ethylene in an alkylation zone containing an alkylating and dehydrating catalyst; introducing ethyl alcohol to said zone at a point intermediate the inlet and outlet ends thereof and therein dehydrating said alcohol to form ethylene and water; withdrawing the reaction mixture from the outlet end of said zone; fractionating said mixture to separate alkylation products from a lower boiling fraction comprising unconverted benzene, ethylene, and water; subjecting said lower boiling fraction to condensation under temperature and pressure conditions suitable for dissolving a substantial portion of said ethylene in said benzene; and recycling said solution of ethylene in benzene to the inlet of said alkylation zone.

4. In a continuous process for the production of ethylbenzene wherein benzene and ethylene are contacted with an alkylating catalyst under alkylating conditions, the improvement which comprises introducing ethyl alcohol at a point intermediate the inlet and outlet ends of the reaction zone and therein converting said alcohol to ethylene and water, forming a solution of said last named ethylene in unconverted benzene, commingling said solution of ethylene in benzene with additional fresh benzene, and introducing said mixture into the inlet end of said reaction zone.

5. The process of claim 2 wherein the catalyst comprises a phosphoric acid alkylating catalyst.

6. The process of claim 2 wherein said catalyst comprises a calcined composite of a catalytically active acid of phosphorus and a generally siliceous adsorbent.

7. The process of claim 2 wherein the catalyst comprises a solid phosphoric acid catalyst and said alkylation zone is maintained at a temperature of from about 400° F. to about 850° F. and a pressure of from about 300 to about 2000 pounds per square inch.

8. A process for the production of ethylbenzene which comprises introducing ethylene and a molar excess of benzene into the first of a plurality of serially disposed catalyst zones containing an alkylating and dehydrating catalyst and therein alkylating said benzene with said ethylene, introducing ethyl alcohol into a subsequent zone in the series and therein dehydrating said alcohol to form ethylene and water, withdrawing the reaction mixture from the last catalyst zone of the series, fractionating said mixture to separate alkylation products from an unconverted benzene fraction containing dissolved ethylene, recovering said alkylation products, and recycling said solution of ethylene in benzene to the first chamber in said series.

9. A process for the production of ethylbenzene which comprises introducing ethylene and a molar excess of benzene into the inlet end of an alkylation zone containing an alkylating and dehydrating catalyst and therein alkylating said benzene with said ethylene; contacting ethyl alcohol with a portion of the catalyst in said zone and therein dehydrating said alcohol to form ethylene and water; withdrawing a mixture of alkylation and dehydration reaction products from said zone; fractionating said mixture to separate alkylation products from an unconverted benzene fraction containing dissolved ethylene; recovering said alkylation products; and recycling said solution of ethylene in benzene to said catalyst zone.

10. A process for the production of ethylbenzene which comprises introducing ethylene and a molar excess of benzene into a catalyst zone containing an alkylating and dehydrating catalyst and therein alkylating said benzene with said ethylene; supplying ethyl alcohol and benzene to a portion of said catalyst zone and therein dehydrating said ethyl alcohol to form ethylene and water; fractionating the reaction products from said catalyst zone; recovering alkylation products and water; and recycling a solution of ethylene in unconverted benzene to said catalyst zone.

11. A process for the production of ethylbenzene which comprise introducing ethylene and a molar excess of benzene into the first of a plurality of serially disposed catalyst zones containing an alkylating and dehydrating catalyst and therein alkylating said benzene with said ethylene; withdrawing the alkylation reaction mixture from an intermediate zone in the series; introducing ethyl alcohol and benzene into the next subsequent zone in the series and therein dehydrating said alcohol to form ethylene and water; commingling the alkylation and dehydration reaction products; fractionating the mixture to separate alkylation products from an unconverted benzene fraction containing dissolved ethylene; recovering said alkylation products; and recycling said solution of ethylene in benzene to the first chamber in said series.

12. The process as defined in claim 1 further characterized in that said aromatic hydrocarbon is alkylated with the olefin in the presence of a catalyst comprising silica and alumina.

13. The process as defined in claim 2 further characterized in that said catalyst comprises silica and alumina.

14. The process as defined in claim 1 further characterized in that said aromatic hydrocarbon is alkylated with the olefin in the presence of a phosphoric acid catalyst.

VLADIMIR N. IPATIEFF.
LOUIS SCHMERLING.